United States Patent
Hosotani et al.

(10) Patent No.: US 10,227,926 B2
(45) Date of Patent: Mar. 12, 2019

(54) EXHAUST GAS ABATEMENT SYSTEM

(71) Applicant: Ebara Corporation, Tokyo (JP)

(72) Inventors: Kazumasa Hosotani, Tokyo (JP); Makoto Kashiwagi, Tokyo (JP); Toyoji Shinohara, Tokyo (JP); Kohtaro Kawamura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 197 days.

(21) Appl. No.: 14/312,265

(22) Filed: Jun. 23, 2014

(65) Prior Publication Data
US 2015/0000870 A1   Jan. 1, 2015

(30) Foreign Application Priority Data

Jun. 24, 2013   (JP) .................................. 2013-131603

(51) Int. Cl.
*F23J 15/06*   (2006.01)
*F02C 7/08*   (2006.01)
(Continued)

(52) U.S. Cl.
CPC .............. *F02C 7/08* (2013.01); *B01D 53/005* (2013.01); *F23J 15/04* (2013.01); *F28D 1/0213* (2013.01); *B01D 53/18* (2013.01); *B01D 53/70* (2013.01); *B01D 53/78* (2013.01); *B01D 2252/103* (2013.01); *B01D 2257/2045* (2013.01); *B01D 2257/2047* (2013.01);
(Continued)

(58) Field of Classification Search
CPC .. B01D 2258/0216; B01D 47/06; F23J 15/04; F23J 2219/40; F28D 1/0213; F28F 9/22

USPC .......................................... 165/159; 110/215
See application file for complete search history.

(56) References Cited

U.S. PATENT DOCUMENTS

| | | | | |
|---|---|---|---|---|
| 3,748,835 A | * | 7/1973 | Panzica .............. | B01D 21/0012 210/413 |
| 4,574,062 A | * | 3/1986 | Weitman ................ | B01D 47/06 165/125 |

(Continued)

FOREIGN PATENT DOCUMENTS

| | | |
|---|---|---|
| CA | 1121336 A1 | 4/1982 |
| CN | 202538594 * | 11/2012 |

(Continued)

OTHER PUBLICATIONS

Kawamura, JP2008161861TRANS (English Translation), Jul. 2008.*
(Continued)

*Primary Examiner* — Eric Ruppert
(74) *Attorney, Agent, or Firm* — Pearne & Gordon LLP

(57) ABSTRACT

An exhaust gas abatement system includes an exhaust gas abatement section configured to abate exhaust gases by utilizing thermal energy and to cool the abated gases by using a liquid, a circulating section configured to circulate the liquid within a circulation path as a circulating liquid, a heat exchange tube configured to cool the circulating liquid and to executes a heat exchange between a cooling liquid which flows in an interior of the heat exchange tube and the circulating liquid which flows outside the heat exchange tube, and a circulating liquid storage portion configured to store the circulating liquid. The heat exchange tube is disposed in a heat exchange tube installation space which is in at least part of an interior of the circulating liquid storage portion.

10 Claims, 6 Drawing Sheets

(51) Int. Cl.
  *B01D 53/00*   (2006.01)
  *F23J 15/04*   (2006.01)
  *F28D 1/02*    (2006.01)
  *B01D 53/18*       (2006.01)
  *B01D 53/70*       (2006.01)
  *B01D 53/78*       (2006.01)
  *F23G 7/06*        (2006.01)
  *F28C 3/06*        (2006.01)
  *F28D 1/053*       (2006.01)
  *F28D 7/08*        (2006.01)
  *F28D 7/16*        (2006.01)

(52) U.S. Cl.
  CPC ............ *B01D 2257/2066* (2013.01); *B01D 2257/553* (2013.01); *B01D 2258/0216* (2013.01); *F23G 7/065* (2013.01); *F23J 2219/40* (2013.01); *F28C 3/06* (2013.01); *F28D 1/05316* (2013.01); *F28D 7/082* (2013.01); *F28D 7/16* (2013.01); *Y02P 80/156* (2015.11)

(56) References Cited

U.S. PATENT DOCUMENTS

| | | | |
|---|---|---|---|
| 4,900,524 | A | 2/1990 | Fullermann |
| 5,001,906 | A | 3/1991 | Engdahl |
| 2008/0131334 | A1 | 6/2008 | Kawamura |
| 2010/0006256 | A1 | 1/2010 | Kuwano et al. |
| 2010/0116140 | A1 | 5/2010 | Arai |

FOREIGN PATENT DOCUMENTS

| | | | |
|---|---|---|---|
| DE | 19837269 | * | 2/2000 |
| EP | 2 541 171 A1 | | 1/2013 |
| JP | S29-3080 Y | | 3/1954 |
| JP | S47-010600 B1 | | 3/1972 |
| JP | S51-14346 U | | 2/1976 |
| JP | S51-113848 U | | 9/1976 |
| JP | S57-62375 A | | 4/1982 |
| JP | S61-114711 A | | 6/1986 |
| JP | 62250925 | * | 10/1987 |
| JP | H06-73678 U | | 10/1994 |
| JP | H09-049626 A | | 2/1997 |
| JP | 2000-325742 A | | 11/2000 |
| JP | 2003-106576 A | | 4/2003 |
| JP | 2008-161861 A | | 7/2008 |
| JP | 2009-018290 A | | 1/2009 |
| JP | 2010-121091 A | | 6/2010 |
| JP | 2011-133201 A | | 7/2011 |
| JP | 2012-218680 A | | 11/2012 |
| JP | 2013-208542 A | | 10/2013 |
| TW | 2008-35545 A | | 9/2008 |
| TW | 2009-00135 A | | 1/2009 |
| TW | 2009-14117 A | | 4/2009 |
| WO | 2008-075509 A1 | | 6/2008 |
| WO | 2008093442 A1 | | 8/2008 |
| WO | 2011-104878 A1 | | 9/2011 |

OTHER PUBLICATIONS

Komuro, JP2000325742TRANS (English Translation), Nov. 2000.*
Shinohara, JP62250925TRANS (English Translation), Oct. 1987.*
International Search report for Application No. PCT/JP2014/071321 dated Nov. 18, 2014.
Extended European Search Report for Application No. 14173683.5 dated Nov. 19, 2014.

* cited by examiner

EXHAUST GAS ABATEMENT SYSTEM

CROSS-REFERENCE TO RELATED APPLICATION

This application claims priority on Patent Application No. 2013-131603 filed in Japan on Jun. 24, 2013, the disclosure of which is hereby incorporated by reference herein in its entirety.

TECHNICAL FIELD

The present invention relates to an exhaust gas abatement technique.

BACKGROUND ART

For example, in the industrial field of semiconductors, toxic gases such as silane ($SiH_4$) gas and halogen system ($NF_3$, $ClF_3$, $SF_6$, $CHF_3$, $C_2F_6$, $CF_4$ or the like) gas are exhausted in the semiconductor fabrication process and are abated by incineration. Exhaust gases abated by incineration include solid constituents (for example, $SiO_2$) or acidic constituents (HF, HCl or the like) as by-products of the abatement by incineration. The exhaust gases are then cleaned to remove those solid and acidic constituents therefrom. As cleaning approaches, the approaches using a fan scrubber, a spray tower and the like are known.

In those exhaust gas abatement systems adopting the incineration process, a large amount of water is necessary to cool and clean the incinerated gases at high temperatures (for example, 1700° C.). In the event that only industrial water or tap water is used to satisfy the necessity of such a large amount of water to be used, the running cost involved in the supply of cooling and cleaning water is increased, leading to an increase in waste water treatment. To cope with this problem, technologies have been developed in which water is circulated for use and the circulating water is cooled by a heat exchanger where a heat exchange is carried out between the circulating water and a cooling liquid (for example, Japanese Unexamined Patent Publication No. 2008-161861, Japanese Unexamined Patent Publication No. 2009-18290).

SUMMARY

One embodiment of the present invention provides an exhaust gas abatement system. This exhaust gas abatement system includes an exhaust gas abatement section configured to abate exhaust gases by utilizing thermal energy and to cool the abated gases by using a liquid, a circulating section configured to circulate the liquid within a circulation path as a circulating liquid, a heat exchange tube configured to cool the circulating liquid and to executes a heat exchange between a cooling liquid which flows in an interior of the heat exchange tube and the circulating liquid which flows outside the heat exchange tube, and a circulating liquid storage portion configured to store the circulating liquid. The heat exchange tube is disposed in a heat exchange tube installation space which is in at least part of an interior of the circulating liquid storage portion.

DESCRIPTION OF EMBODIMENTS

Figure 1:
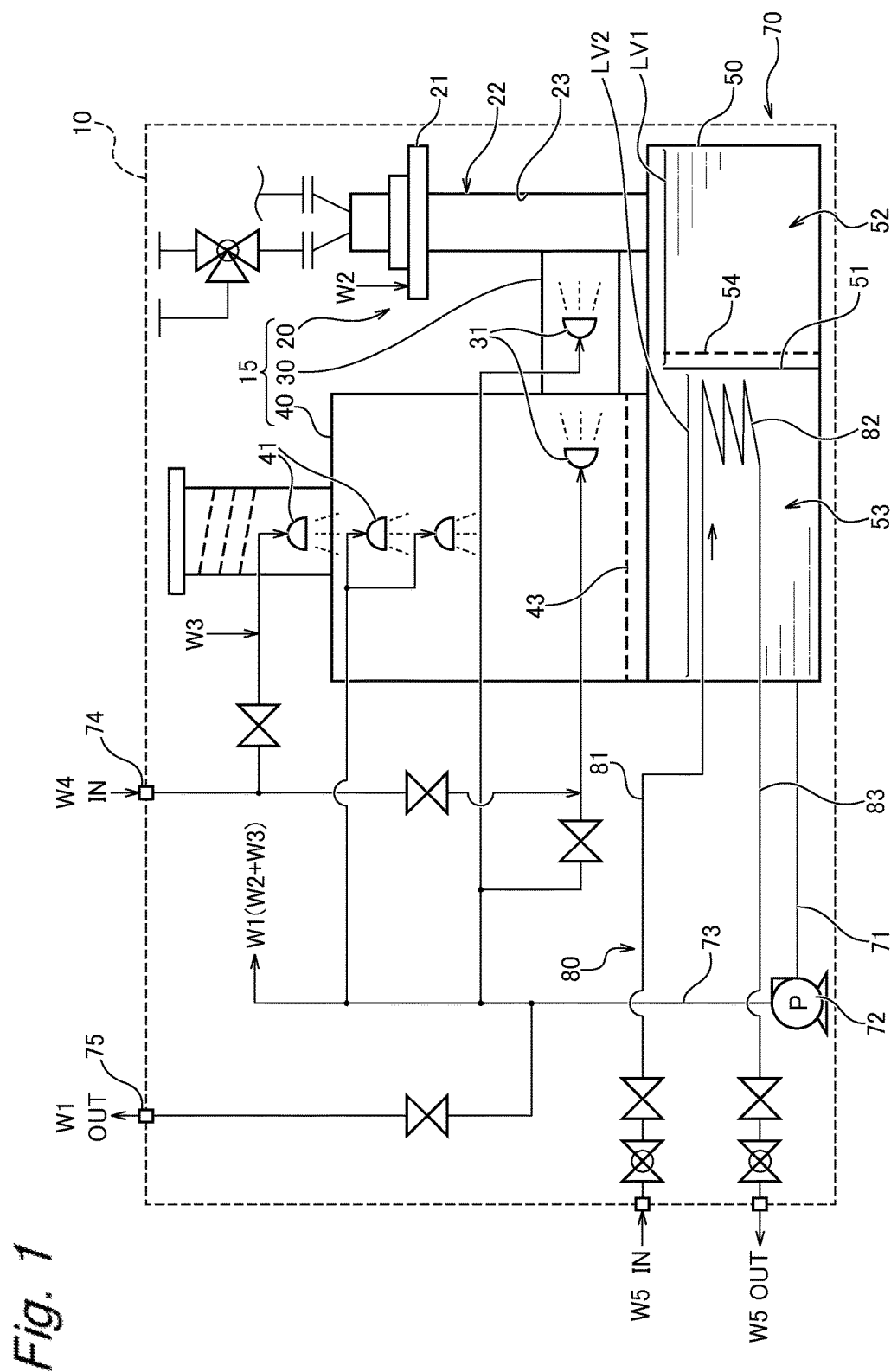
FIG. 1 is an explanatory diagram which shows a schematic configuration of an exhaust gas abatement system as a first embodiment of the invention.

A first embodiment of the present invention provides an exhaust gas abatement system. This exhaust gas abatement system includes an exhaust gas abatement section configured to abate exhaust gases by utilizing thermal energy and to cool the abated gases by using a liquid, a circulating section configured to circulate the liquid within a circulation path as a circulating liquid, a heat exchange tube configured to cool the circulating liquid and to executes a heat exchange between a cooling liquid which flows in an interior of the heat exchange tube and the circulating liquid which flows outside the heat exchange tube, and a circulating liquid storage portion configured to store the circulating liquid. The heat exchange tube is disposed in a heat exchange tube installation space which is in at least part of an interior of the circulating liquid storage portion.

According to the exhaust gas abatement system of the first embodiment, since the heat exchange tube is provided in the interior of the circulation path of the circulating liquid, a heat exchanger installation space does not have to be provided separately. Consequently, the quantity of water that is necessary for exhaust gas abatement can be reduced without increasing an installation space for the exhaust gas abatement system. Moreover, even if the cooling liquid leaks out of the heat exchange tube, the cooling liquid only leaks out into the circulation path of the circulating liquid, and therefore, there is no such situation that the cooling liquid leaks out to the outside (of the system). In addition, when the heat exchange tube is provided outside the circulation path of the circulating liquid, piping is necessary which guides the circulating liquid to the heat exchanger. However, according to the exhaust gas abatement system described above, the necessity of provision of such piping is obviated, and therefore, the length of the piping for the circulating liquid can be shortened, and the number of connections along the length of the piping can be reduced. Because of this, the risk of leakage of the circulating liquid can be reduced. Further, since the heat exchange tube can be installed in the relatively large space, a large heat transfer area can be secured, thereby facilitating the enhancement of heat exchanging efficiency.

According to a second embodiment, in the first embodiment, the heat exchange tube is configured so that the cooling liquid and the circulating liquid flow in opposite directions. According to the second embodiment, the heat exchanging efficiency can be enhanced.

According to a third embodiment, in the first or second embodiment, the heat exchange tube executes a heat exchange between the cooling liquid which flows in an interior of the heat exchange tube and the circulating liquid which flows in the circulating water storage portion. According to the third embodiment, a wall surface of the circulating liquid storage portion doubles as a casing of the heat exchanger. In other words, the heat exchange tube and the circulating liquid storage portion constitute the heat exchanger. Consequently, compared with a case where a heat exchange unit including a casing is disposed in the circulating liquid storage portion, the system configuration can be simplified.

According to a fourth embodiment, in the third embodiment, the heat exchange tube installation space is formed as a serpentine channel in which the circulating liquid flows in a serpentine fashion. The heat exchange tube is disposed along the serpentine channel. According to the fourth embodiment, the heat transfer area of the heat exchange tube can be increased within the small installation space, and the period of time during which the circulating water is kept in touch with the heat transfer surface of the heat exchange tube can be extended. As a result of this, it is possible to enhance the heat exchanging efficiency.

According to a fifth embodiment, in the first or second embodiment, the exhaust gas abatement system further includes a circulating liquid tube configured to house the heat exchange tube in an interior thereof and to flow the circulating liquid between the heat exchange tube and the circulating liquid tube. The heat exchange tube executes a heat exchange between the cooling liquid which flows in the interior of the heat exchange tube and the circulating liquid which flows from the circulating liquid storage portion into the circulating liquid tube. The circulating liquid tube is formed into a serpentine channel in which the circulating liquid flows in a serpentine fashion. According to the fifth embodiment, the same advantage as that provided by the fourth embodiment can be provided. Moreover, since the heat exchange tube installation space does not have to be formed into the serpentine channel, the configuration of the circulating liquid storage portion can be simplified.

According to a sixth embodiment, in the first or second embodiment, the heat exchange tube has a plurality of tube groups in each of which a plurality of tubes are arranged in a plate-like fashion. The plurality of tube groups are disposed so as to be spaced apart from each other in the heat exchange tube installation space. The heat exchange tube installation space is partitioned by the plurality of tube groups to thereby be formed into a serpentine channel in which the circulating liquid flows in a serpentine fashion. According to the sixth embodiment, the same advantage as that provided by the fifth embodiment can be provided.

According to a seventh embodiment, in any one of the first to sixth embodiments, the exhaust gas abatement system further includes a filter through configured to filter the circulating liquid used in the exhaust gas abatement section. The circulating liquid which has passed through the filter is guided into the heat exchange tube installation space. According to the seventh embodiment, even if solid constituents are contained in the circulating liquid in the exhaust gas abatement section, the circulating liquid from which the solid constituents are removed by the filter is guided into the heat exchange tube installation space. Consequently, it is possible to suppress that the solid constituents adhere to the heat transfer surface of the heat exchange tube. As a result of this, it is possible not only to suppress the reduction in heat exchanging efficiency of the heat exchange tube but also to reduce a maintenance (cleaning) load of the heat exchange tube that is borne by the user.

According to an eighth embodiment, in any one of the first to seventh embodiments, at least part of the circulating liquid storage portion has two or more chambers which are divided vertically by a partition wall and adjacent chambers of which communicate with each other. The heat exchange tube installation space is in one of the two or more changes. According to the eighth embodiment, since the volume or interior space of the circulating liquid storage portion can be made effective use in a three-dimensional fashion or vertically, the degree of freedom in installation of the heat exchange tube is enhanced.

According to a ninth embodiment, in any one of the first to eigtht embodiments, the heat exchange tube contains a resin material. According to the ninth embodiment, when acidic gases in the exhaust gases dissolve into the circulating liquid, it is possible to suppress the corrosion of the heat exchange tube by the resulting acidic circulating liquid.

According to a tenth embodiment, in any one of the first to ninth embodiments, the circulating liquid storage portion is divided into a first chamber and a second chamber by a dam. In the liquid used in the exhaust gas abatement section, the liquid used on an upstream side of a flow path of the exhaust gases flows into the first chamber, while the liquid used on a downstream side of the flow path of the exhaust gases flows into the second chamber. The circulating liquid which overflows from the first chamber by passing over the dam flows into the second chamber. The heat exchange tube installation space is in the second chamber. A relatively large quantity of solid constituents are contained in the circulating liquid used on the upstream side of the flow path of the exhaust gases. However, according to the tenth embodiment, the solid constituents settle down in the first chamber, and therefore, it is possible to suppress a risk of the solid constituents adhering to the heat transfer surface of the heat exchange tube which is provided in the second chamber.

According to an eleventh embodiment, in the tenth embodiment including at least seventh embodiment, a first filter is provided in the first chamber as the filter. The liquid that flows into the first chamber permeates through the first filter and thereafter flows into the second chamber. According to the eleventh embodiment, it is suppressed further a risk of the solid constituents contained in the circulating liquid stored in the first chamber moving to the second chamber, as a result of which it is possible to suppress further a risk of the solid constituents adhering to the heat transfer surface of the heat exchange tube.

According to a twelfth embodiment, in the tenth or eleventh embodiment including at least seventh embodiment, a second filter is provided above the second chamber as the filter. The liquid used on the downstream side of the flow path of the exhaust gases permeates through the second filter and thereafter flows into the second chamber. According to the twelfth embodiment, even if solid constituents are contained in the liquid that is used on the downstream side of the flow path of the exhaust gases, the solid constituents are trapped by the second filter, and therefore, it is possible to suppress a risk of the solid constituents adhering to the heat transfer surface of the heat exchange tube.

A. First Embodiment

FIG. 1 shows a schematic configuration of an exhaust gas abatement system 10 as a first embodiment. In this embodiment, the exhaust gas abatement system 10 is an abatement system which abates exhaust gases exhausted in a semiconductor fabrication process before they are discharged to the atmosphere. The exhaust gas abatement system 10 includes an exhaust gas abatement section 15, a water circulating section 70, and a heat exchanger section 80. The exhaust gas abatement section 15 includes an incinerating portion 20, a cooling portion 30, and a cleaning portion 40 and abates exhaust gases by using a circulating water W1. The circulating water W1 may simply be water or a solution to which a predetermined additive (for example, an alkaline agent to neutralize an acidic gas) is added. The water circulating section 70 includes a circulating water storage portion 50, water circulating pipes 71, 73, and a water circulating pump 72, whereby the circulating water W1 is circulated. The heat exchanger section 80 executes a heat exchange between the circulating water W1 and a cooling water W5.

The incinerating portion 20 receives exhaust gases that flow thereinto from thereabove, incinerates the exhaust gases with a mixture of air and an incineration supporting gas which are supplied separately from the exhaust gases and sends the incinerated exhaust gases downwards. Here, the incineration temperature is, for example, 1700° C. This incinerating portion 20 includes a water flow flange portion 21 and an incineration chamber 22. The incineration chamber 22 has a volumetric capacity which is sufficient to allow the exhaust gases to stay therein for a predetermined period of time, and the exhaust gases are burned completely. Solid constituents (SiO2 and the like) and acidic gases are produced as by-products as a result of the incineration of the exhaust gases.

In this embodiment, a water film is formed on an inner wall surface 23 of the incineration chamber 22 by a circulating water W1 that is supplied from the water flow flange portion 21. By forming the water film in this way, it is possible to restrain the inner wall surface 23 from being heated to a high temperature. This enables the inner wall surface 23 to be formed of a relatively inexpensive material and obviates the necessity of using an expensive heat-resistant material such as a glass ceramic material (for example, an alumina-based material). Additionally, since the inner wall surface 23 is restrained from being brought into contact with exhaust gases, it is possible to suppress the corrosion of the inner wall surface 23. The inner wall surface 23 may be coated with a resin material such as a PFA (a tetrafluoroethylene-perfluoro alkyl vinyl ether copolymer) or the like which has heat resistance and corrosion resistance. By adopting this configuration, even if the acidic gas dissolves into the circulating water W1, it is possible to avoid that the inner wall surface 23 is corroded by the resulting acidic circulating water W1. Additionally, coating the inner wall surface 23 in that way makes it difficult for solid constituents to adhere to the inner wall surface 23, thereby making it possible to reduce the labor for cleaning of the incineration chamber 22.

The exhaust gases which are incinerated in the incinerating portion 20 are sent into the cooling portion 30 connected to a lower part of the incinerating portion 20. In the cooling portion 30, the exhaust gases are cooled by a circulating water W1 which is sprayed from nozzles 31. The exhaust gases which are cooled in the cooling portion 30 are sent to the cleaning portion 40. Although part of the circulating water W1 which is sprayed in the cooling portion 30 is evaporated to be contained in the exhaust gases, most of the circulating water W1 so sprayed flows along a bottom surface of the cooling portion 30 to flow into the incineration chamber 22 and thereafter flows into a first chamber 52, which will be described later.

In this embodiment, the cleaning portion 40 is configured as a cleaning tower (a spray tower) which includes a plurality of nozzles 41. The solid constituents and acidic gases which are contained in the exhaust gases are trapped by a circulating water 1 sprayed from the nozzles 41. However, there is imposed no specific limitation on the type of the cleaning portion 40, and hence, the cleaning portion 40 can take any form in which wet cleaning is executed. For example, a fan scrubber can be adopted. The exhaust gases which are wet cleaned are discharged from an upper side of the cleaning portion 40. A second filter 43 is provided at a lower portion of the cleaning portion 40, and the circulating water W1 sprayed from the nozzles 41 permeates through the second filter 43 to move downwards.

The circulating water storage portion 50 is a tank for storing the circulating water W1. The circulating water storage portion 50 can take any form and may be a concrete water tank or a resin container. The circulating water storage portion 50 includes a dam 51 which divides an interior space of the circulating water storage portion 50 into two chambers. The circulating water storage portion 50 is divided into the first chamber 52 and a second chamber 53 by the dam 51. The first chamber 52 is disposed directly below the incinerating portion 20, and the second chamber 53 is disposed directly below the cleaning portion 40.

The circulating water W1 which forms the water film in the incinerating portion 20 flows directly downwards into the first chamber 52 to be stored therein. The circulating water W1 which forms the water film contains a large amount of solid constituents (dust) as the by-products produced in the incinerating portion 20. Additionally, relatively large solid constituents fall into the first chamber 52 by their own weight. The solid constituents contained in the circulating water W1 settle down in the first chamber 52. A first filter 54 is provided near the dam 51 in the first chamber 52. When the level of the circulating water W1 stored in the first chamber 52 exceeds the height of the dam 51, the circulating water W1 which permeates through the first filter 53 flows over the dam 51 into the second chamber 53. Because of this, a water level LV1 of the first chamber 52 is higher than a water level LV2 of the second chamber 53. As is obvious from what has been described heretofore, most of the solid constituents contained in the circulating water W1 that is stored in the first chamber 52 are removed therefrom by allowing them to settle down in the first chamber 52. Then, almost all of the solid constituents that remain in the circulating water W1 are removed by the first filter 54 and the resulting circulating water W1 flows into the second chamber 53. The dam 51 advantageously reduces the filtration load of the first filter 54, in other words, the cleaning frequency thereof. An inspection window may be provided in a side of the first chamber 52 so as to be opened or closed. By adopting this configuration, it is possible not only to confirm the settling conditions of the solid constituents in the first chamber 52 or the adhering conditions of the solid constituents to the first filter 54 but also to facilitate the cleaning of the first filter 54.

In addition to the circulating water W1 that flows thereinto from the first chamber 52, the circulating water W1 sprayed in the cleaning portion 40, that is, the circulating water W1 which has permeated through the second filter 43 also flows into the second chamber 53. The circulating water W1 sprayed in the cleaning portion 40 traps therein the solid constituents in the exhaust gases and therefore contains them. Most of the solid constituents in the exhaust gases are trapped by the second filter. The circulating water W1 stored in the second chamber 53 is cooled by a heat exchange tube 82 (which will be described in detail later) disposed in an interior of the second chamber 53 and is thereafter supplied back to the incinerating portion 20, the cooling portion 30 and the cleaning portion 40 by way of circulation lines, that is, the circulating water storage portion 50 which is the space through which the circulating water W1 flows or in which the circulating water W1 is stored temporarily and the water circulating pipes 71, 73. In FIG. 1, the circulating water W1 supplied to the incinerating portion 20 is shown as circulating water W2, and the circulating water W1 supplied to the cleaning portion 40 is shown as circulating water W3. An openable and closable inspection window may be provided in a side of the second chamber 53. By providing the inspection window in that way, check of the adhering conditions of the solid constituents to the second filter 43 or the cleaning of the second filter 43 can be facilitated. Additionally, the placement, replacement and cleaning of the heat exchange tube 82 can also be facilitated.

A supply water W4 (for example, industrial water or tap water) is supplied continuously or intermittently from a supply port 74 to the circulating water W1 that is used repeatedly in circulation. The circulating water W1 can be cooled by the supply water W4 so supplied. Additionally, acidic gases contained in exhaust gases dissolve into the circulating water W1, and the degree of acidity of the circulating water W1 is gradually increased while it is circulating. However, the increase in degree of the acidity of the circulating water W1 can be suppressed by the supply water W4 so supplied. Part of the circulating water W1 is discharged continuously or intermittently by way of a discharge port 75. This also prevents excess increase in degree of the acidity of the circulating water W1.

The heat exchanger section 80 includes cooling pipes 81, 83 and the heat exchange tube 82 which is interposed between the cooling pipes 81, 83. A cooling water W5 is circulated within the heat exchanger section 80 by a circulation pump (not shown). As has been described above, the heat exchange tube 82 is disposed in a position which is situated lower than the water level LV2 in the interior of the second chamber 53. When the cooling water W5 flows into an interior of the heat exchange tube 82, a heat exchange is executed between the cooling water W5 and the circulating water W1 which flows around an exterior of the heat exchange tube 82 (in the interior of the second chamber 53), whereby the circulating water W1 is cooled.

Figure 2:
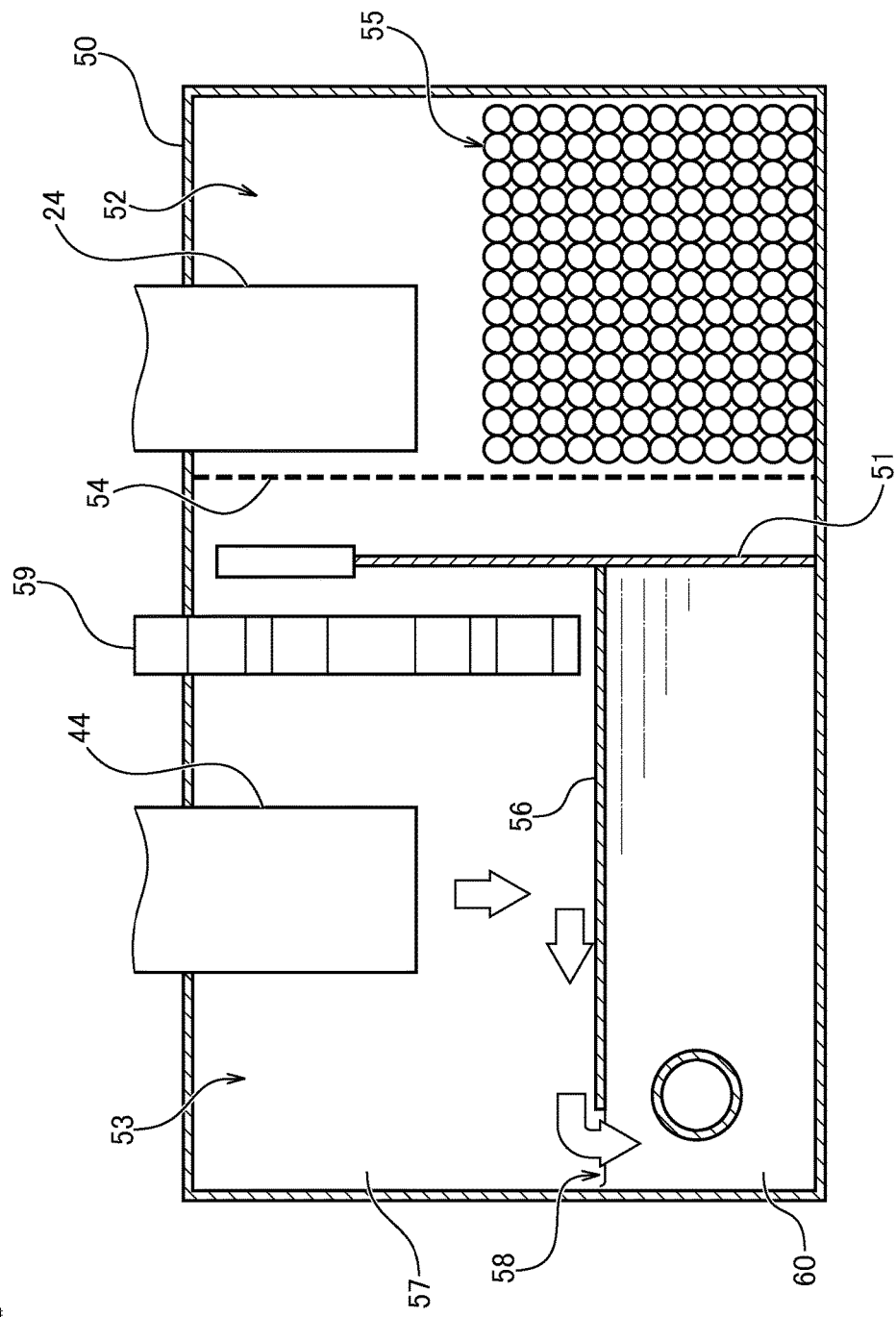
FIG. 2 is a schematic front view of a circulating water storage section.

FIG. 2 shows a schematic configuration in section of the circulating water storage portion 50. As shown, an incinerating portion connecting short pipe 24 is inserted into the first chamber 52. This incinerating portion connecting short pipe 24 connects to a lower end portion of the incinerating portion 20. A settlement space 55 for settlement of the solid constituents is secured at a bottom portion of the first chamber 52.

The second chamber 53 has a partition wall 56 which divides vertically an interior space thereof into two portions. The second chamber 53 is divided into an upper storage chamber 57 and a lower heat exchange tube installation space 60 by the partition wall 56. The storage chamber 57 is mainly intended to store the circulating water W1 therein. The lower heat exchange tube installation space 60 is mainly intended to install the heat exchange tube 82 therein. The storage chamber 57 and the heat exchange tube installation space 60 communicate with each other through a communication hole 58, whereby the circulating water W1 flows from the storage chamber 57 into the heat exchange tube installation space 60 through the communication hole 58. A cleaning portion connecting short pipe 44 is inserted into the second chamber 53, and this cleaning portion connecting short pipe 44 connects to a lower end portion of the cleaning portion 40. The volume or interior space of the second chamber 53 can be made use of effectively in a three-dimensional or vertical fashion by dividing the second chamber 53 in the way described above, whereby the degree of freedom in installation of the heat exchange tube 82 is increased. The second chamber 53 may be divided vertically into three or more chambers. As this occurs, any of part of those three or more chambers may be secured for the heat exchange tube installation space 60.

Additionally, a water level indicator 59 is provided in the storage chamber 57. In this embodiment, when the water level indicator 59 detects that a water level in the storage chamber 57 is equal to or higher than a predetermined level, the supply of the cooling water W5 into the heat exchange tube 82 is stopped by a control unit (not shown) which controls the exhaust gas abatement system 10. According to this configuration, even if the cooling water W5 leaks out of the heat exchange tube 82 to increase the water level LV2 in the second chamber 53, there is no such situation that the circulating water W1 overflows from the circulating water storage portion 50. The speed of elevation of the water level LV2 when the cooling water W5 leaks out of the heat exchange tube 82 is faster than that in normal water level variation, and therefore, the control unit may be configured to monitor the results of the detection by the water level indicator 59 to detect a leakage of the cooling water W5 based on the change in speed of variation of the water level LV2.

Figure 3:
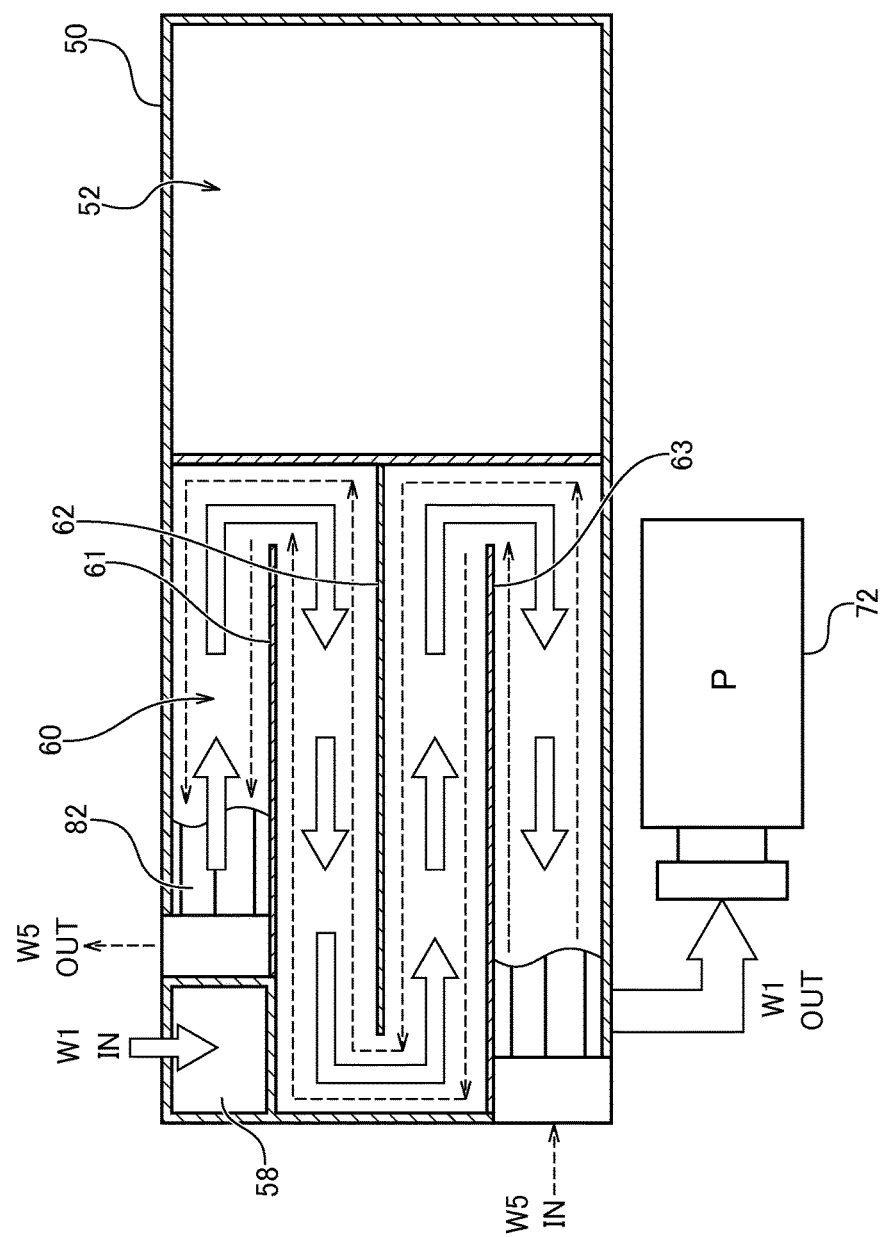
FIG. 3 is a schematic explanatory diagram which shows a schematic internal configuration of a heat exchange tube installation space.

FIG. 3 shows a schematic configuration of the circulating water storage portion 50 as projected on a horizontal plane. In FIG. 3, an area corresponding to the second chamber 53 is shown as the heat exchange tube installation space 60. As shown, three partition walls 61, 62, 63 are provided in the heat exchange tube installation space 60. The heat exchange tube installation space 60 is formed into a serpentine channel in which the direction of flow of the circulating water W5 is turned three times on the plane. The heat exchange tube 82 is disposed so as to follow the serpentine channel. According to this configuration, a heat transfer area of the heat exchange tube 82 can be increased within the limited installation space, and a period of time during which the circulating water is kept in touch with the heat transfer surface of the heat exchange tube 82 can be extended. As a result of this, the heat exchanging efficiency of the heat exchange tube 82 can be enhanced. Additionally, the cross sectional area of the flow path of the circulating water W1 is reduced to thereby increase the flow velocity, or the circulating water W1 is formed to flow in a serpentine fashion, whereby the flow of the circulating water W1 is disturbed into a turbulent flow, enhancing the efficiency of heat exchange.

In addition, as shown in FIG. 3, in this embodiment, the cooling water W5 flowing in the interior of the heat exchange tube 82 and the circulating water W1 flowing outside the heat exchange tube 82 flow in opposite directions each other. By causing the two fluids between which heat is exchanged to flow in the opposite directions in this way, the heat exchange efficiency therebetween can be enhanced.

Figure 4B:
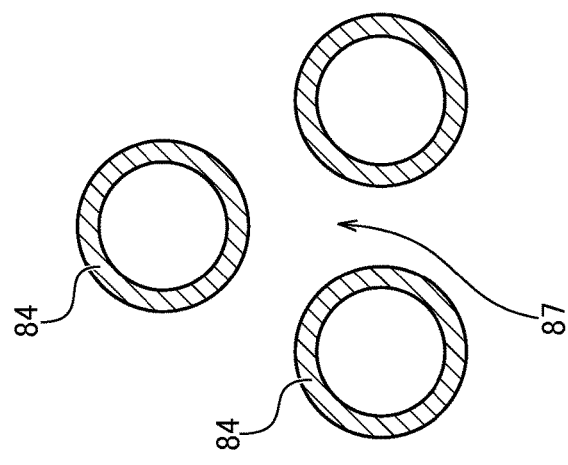
FIGS. 4A and 4B show explanatory diagrams showing the configuration of the heat exchange tube.
Figure 4A:
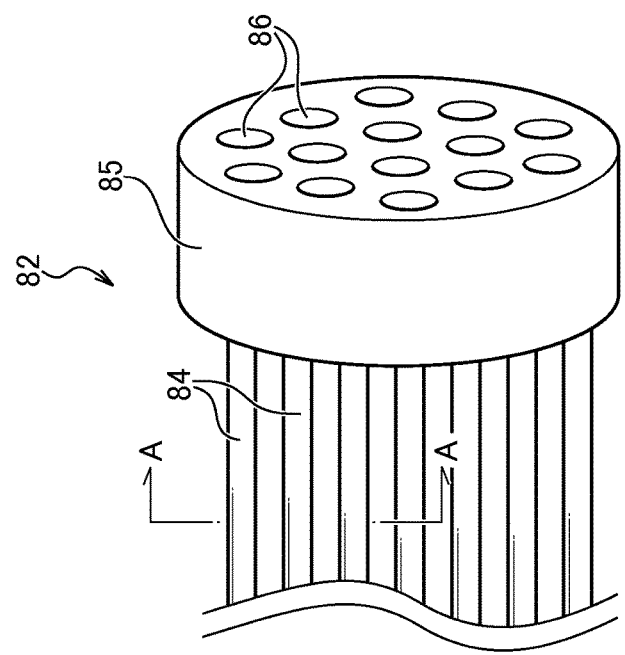

FIGS. 4A and 4B show schematically the configuration of the heat exchange tube 82. The heat exchange tube 82 of the embodiment is a multi-tube structure and includes a plurality of tubes 84 and a tube-welded portion 85, as shown in FIG. 4A. The cooling water W5 flows through the tubes 84. In this embodiment, the tubes 84 are formed from PFA. Because of this, even if the circulating water W1 which is acidic flows outside the tubes 84 (in the heat exchange tube installation space 60), the corrosion of the tubes 84 is preferably suppressed. In addition, the PFA suppress the adhesion of solid constituents to outer surfaces of the tubes 84. Adopting this configuration can reduce remarkably the frequency at which the tubes 82 are replaced or cleaned, thereby making it possible to reduce the costs and labor hours which are involved in maintaining the exhaust gas abatement system 10. The material of the tubes 84 is not limited to PFA, and hence, a material which contains any resin material having a predetermined corrosion resistance, heat transfer properties, heat resistance and pressure resistance. For example, the resin material may be PTFE (polytetrafluoroethylene). Additionally, the tubes 84 may be a metallic tube whose outer surface is coated with PFA. Even if this approach is adopted, the corrosion resistance can be secured to some extent.

A plurality of through holes 86 are formed in the tube-welded portion 85. In this embodiment, the number of through holes 86 is equal to that of tubes 84. The tubes 84 are inserted individually into the through holes 86 in a one-to-one relationship, and the tubes 84 are all welded to the tube-welded portion 85. This tube-welded portion 85 and another tube-welded portion 85 are provided at both ends of the tubes 84. By adopting this configuration, spaces 87 are formed between the tubes 84 as shown in FIG. 4B. According to this configuration, the circulating water W1 enters the spaces 87 to thereby increase the heat exchanging efficiency of the heat exchange tube 82. Moreover, the tube-welded portions 85 disturb the flow of the circulating water W1, producing a turbulent flow, whereby it is possible to enhance the efficiency of heat exchange. Additionally, a plurality of tube dispersion plates are provided between the two tube-welded portions 85. A plurality of through holes are formed in each of the tube dispersion plates, and the tubes 84 are inserted individually through the through holes in a one-to-one relationship. These tube dispersion plates can preferably secure the spaces 87 over the length of the tubes 84, and the dispersion plates provide the same advantage as that provided by the tube-welded portions 85.

It is preferable that as many diametrically small tubes 84 as possible are bundled up into the heat exchange tube 82, so that the heat transfer area of the heat exchange tube 82 can be increased without increasing the volume of the heat exchange tube 82. Additionally, it is preferable that the tubes 84 are as thin as possible so as to enhance the heat exchanging efficiency thereof. The tubes 84 used in this embodiment are thinner than generally marketed PFA tubes. By adopting this configuration in which the plurality of tubes 84 are used as the embodiment, the capacity of the heat exchange tube 82 can be changed by changing the number of tubes 84 to be used. For example, a mass of standardized tubes 84 are produced, and the number of tubes 84 is changed according to a thermal load of the exhaust gas abatement system 10, whereby it is possible to deal with a variety of exhaust gas abatement conditions.

The tube-welded portions 85 bundling up the plurality of tubes 84 are screwed into couplers for connection, and the couplers are then connected individually to the cooling pipes 81, 83. There is imposed no specific limitation on the form of connection. For example, the tube-welded portion 85 and the coupler each may have a flange construction so that the tube-welded portion 85 and the coupler are connected together at their flanges.

According to the exhaust gas abatement system 10 described above, since the heat exchange tube 82 is provided in the interior of the circulating water storage portion 50 (more specifically, the second chamber 53), a space for installation of the heat exchange tube 82 does not have to be provided separately. Consequently, the quantity of water necessary for abatement of exhaust gases can be reduced without increasing the installation space of the exhaust gas abatement system 10. Further, since the circulating water storage portion 50 occupies a relatively large space, the heat transfer area can be secured largely, thereby facilitating the enhancement of the heat exchanging efficiency. Moreover, even if the cooling water W5 leaks from the heat exchange tube 82, the cooling water W5 only leaks into the circulation path of the circulating water W1, and hence, there is no such situation that the cooling water W5 leaks out to the outside (of the system). In addition, in the event that the heat exchange tube 82 is provided outside the circulation path of the circulating water W1, piping is necessary which guides the circulating water W1 to the heat exchange tube 82. However, according to this embodiment, the necessity of provision of such piping is obviated, and hence, the piping for the circulating water W1 does not have to be laid out long or can be shortened. Additionally, the number of connections of pipes along the piping can be reduced. This can reduce the risk of leakage of the acidic circulating water W1.

According to the exhaust gas abatement system 10, the wall surface of the circulating water storage portion 50 doubles as a casing of a heat exchanger. In other words, the heat exchange tube 82 and the circulating water storage portion 50 constitute a heat exchanger. Consequently, compared with a case where an existing heat exchange unit is disposed in the circulating water storage portion 50, the system configuration of the exhaust gas abatement system 10 can be simplified.

According to the exhaust gas abatement system 10, the resin material which has a superior corrosion resistance and an inferior heat transfer performance to those of metal is used for the heat exchange tube 82. On the other hand, the heat exchanging efficiency of the heat exchange tube 82 is enhanced by the various configurations of the heat exchange tube 82 and the heat exchange tube installation space 60 that are described above. Thus, in this embodiment, the corrosion resistance and the heat transfer performance are compatible with each other.

According to the exhaust gas abatement system 10, since the circulating water W1 from which most of the solid constituents are removed by the second filter 43, the dam 51 and the first filter 54 is introduced into the heat exchange tube 82, it is possible to suppress the adhesion of solid constituents to the heat transfer surface of the heat exchange tube 82. As a result of this, the reduction in heat exchanging efficiency of the heat exchange tube 82 can be suppressed, and a cleaning load of the heat exchange tube 82 borne by the user can also be reduced.

B. Second Embodiment

Figure 5:
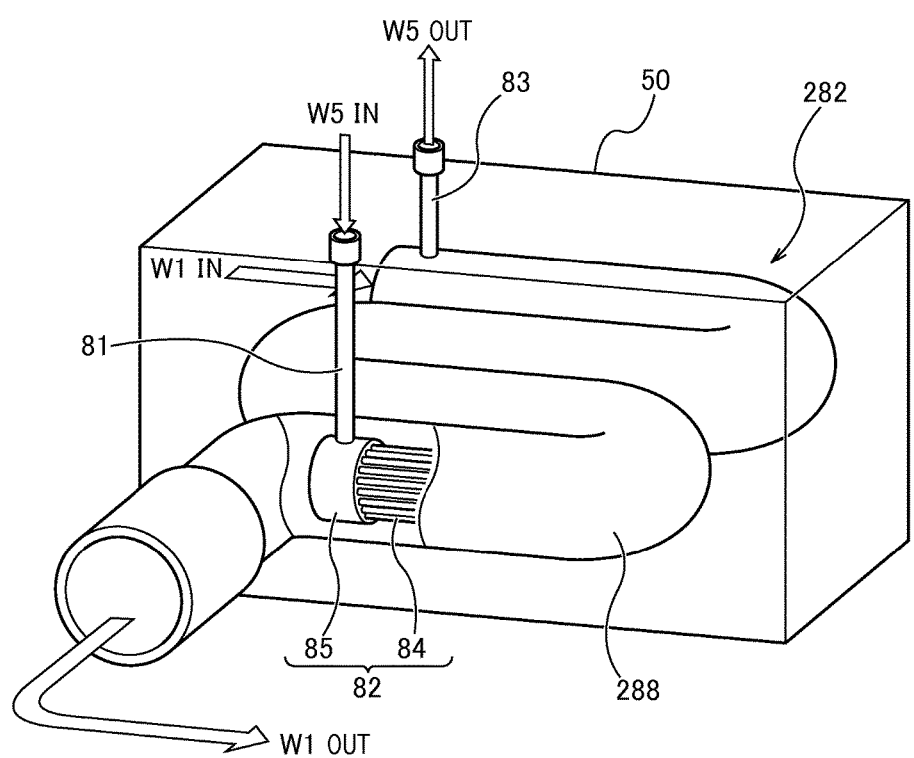
FIG. 5 is an explanatory diagram showing part of the configuration of an exhaust gas abatement system as a second embodiment.

FIG. 5 shows part of the configuration of an exhaust gas abatement system of a second embodiment. In FIG. 5, like reference numerals are given to like constituent elements to those of the first embodiment (FIG. 1). The exhaust gas abatement system of the second embodiment differs from that of the first embodiment in that a heat exchanger 282 is provided in place of the heat exchange tube 82 in the first embodiment but is similar in the other features to the first embodiment. Hereinafter, the feature different from the first embodiment will be described. The heat exchanger 282 includes a heat exchange tube 82 and a water circulation pipe 288. The heat exchange tube 82 is housed in an interior of the water circulation pipe 288. The water circulation pipe 288 has a horizontally curved shape so as to form a serpentine channel, and the heat exchange tube 82 also has a shape which follows the shape of the water circulation pipe 288. The water circulation pipe 288 is connected to a suction port of a water circulation pump 72. There is imposed no specific limitation on the shape of the water circulation pipe 288, and hence, the water circulation pipe 288 may have a spiral shape while extending vertically. The water circulation pipe 288 may include a partitioning construction in an interior thereof so as to form a serpentine channel in the interior thereof.

A circulating water W1 stored in a circulating water storage portion 50 flows into the interior of the water circulation pipe 288 for heat exchange with a cooling water W5 which flows in an interior of the heat exchange tube 82 and is then sucked in by the water circulation pump 72. This configuration can be regarded as a simple shell-and-tube system. According to this configuration, the same advantage as that provided by the first embodiment can be provided without providing partition walls 61 to 63 in a heat exchange tube installation space 60. Namely, the construction of the heat exchange tube installation space 60 can be simplified. Additionally, in installing the heat exchanger 282 in an interior of the circulating water storage portion 50, the heat exchange tube 82 is installed in the water circulation pipe 288 outside the circulating water storage portion 50, and thereafter, the water circulation pipe 288 and the heat exchange tube 82 can be installed in the interior of the circulating water storage portion 50. Consequently, the work to be performed in the interior of the circulating water storage portion 50 is reduced, the installation work being thereby facilitated.

C. Third Embodiment

Figure 6:
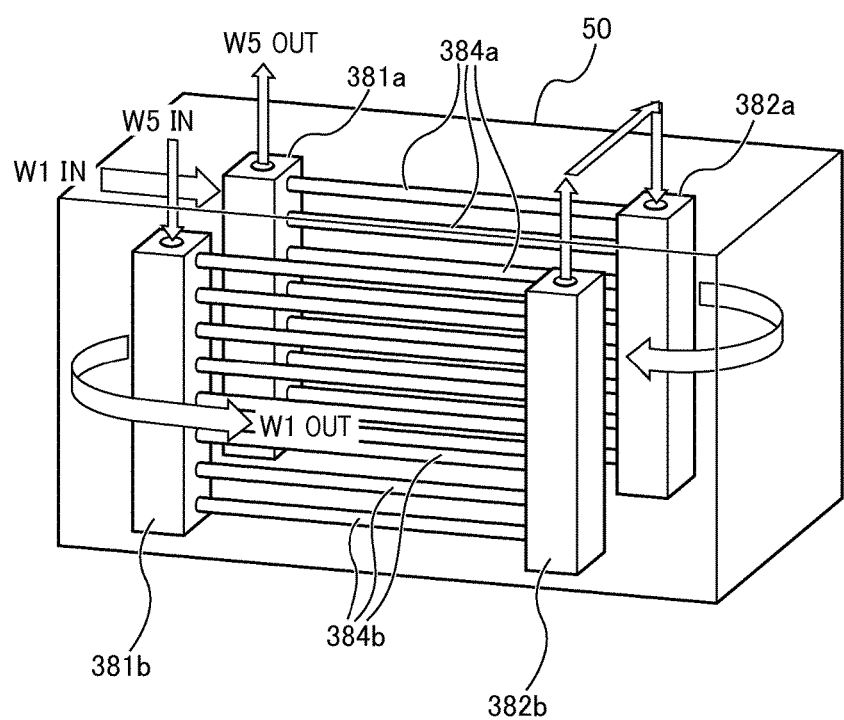
FIG. 6 is an explanatory diagram showing part of the configuration of an exhaust gas abatement system as a third embodiment.

FIG. 6 shows part of the configuration of an exhaust gas abatement system of a third embodiment. The third embodiment differs from the first embodiment in that the exhaust gas abatement system includes a first tube group 384*a*, a second tube group 384*b*, and header pipes 381*a*, 382*a*, 381*b*, 382*b* in place of the heat exchange tube 82 of the first embodiment but is similar in the other features to the first embodiment. Hereinafter, the feature of the third embodiment which differs from the first embodiment will be described. The header pipes 381*a*, 382*a* are connected to end portions of the first tube group 384*a*. Similarly, the header pipes 381*b*, 382*b* are connected to end portions of the second tube group 384*b*.

A cooling water W5 introduced into the header pipe 381*b* flows through an interior of the second tube group 384*b* and then flows into the header pipe 382*b*. The cooling water W5 that has flowed into the header pipe 382*b* flows into the header pipe 382*a* and thereafter flows into an interior of the first tube group 348*a*. The cooling water W5 then flows into the header pipe 381*a*. In each of the first tube group 384*a* and the second tube group 384*b*, a plurality of tubes are arranged into a plate-like fashion. In FIG. 6, while the tubes are shown as being arranged with spaces defined therebetween, in reality, the tubes are arranged in such a way that almost no space is defined therebetween.

The first tube group 384*a* and the second tube group 384*b* are provided spaced away from each other, as a result of which a circulating water storage portion 50 (a heat exchange tube installation space 60) is partitioned by the first tube group 384*a* and the second tube group 384*b*, whereby a serpentine channel of a circulating water W1 is formed. According to this configuration, the same advantage can be provided which is the same as that provided by the first embodiment without providing partition walls 61 to 63 in the heat exchange tube installation space 60. Namely, the construction of the heat exchange tube installation space 60 can be simplified. Moreover, compared with the heat exchange tube 82 of the first embodiment, the width of a circulation path of the circulating water W1 can be narrowed, as a result of which the degree of freedom in installation of the first tube group 384*a* and the second tube group 384*b* is enhanced. Additionally, the flow velocity of the circulating water W1 is increased, whereby the flow of the circulating water W1 is disturbed to produce a turbulent flow, enhancing the efficiency of heat exchange. Each of the first tube group 384*a* and the second tube group 384*b* may be configured to flow the cooling water W5 therethrough independently. Additionally, two or more tube groups may be provided, and for example, three tube groups may be provided.

D. Modification

D-1. Modification 1

A temperature sensor may be provided within a circulation path of a circulating water W1. By monitoring the temperature of the circulating water W1 with the temperature sensor, it is possible to detect a reduction in heat exchanging efficiency as a result of minute solid constituents adhering to a heat exchange tube 82. As a result of this, the operator can preferably determine on a timing of maintenance (cleaning or the like) of the heat exchange tube 82, and additionally, the safety of the exhaust gas abatement system 10 is enhanced.

D-2. Modification 2

The embodiments that have been described above can be applied to various types of exhaust gas abatement systems in which exhaust gases are abated by making use of thermal energy and the abated exhaust gases are cooled by a circulating water and can be provided, for example, in an exhaust gas abatement system by incineration process, catalytic process, or plasma process.

Thus, while the mode for carrying out the invention has been described based on the several embodiments, the embodiments are intended to facilitate the understanding of the invention but are not intended to limit the invention. The invention can, of course, be modified or improved variously without departing from the spirit and scope thereof, and the equivalents thereof are contained in the invention. Additionally, an arbitrary combination or omission of the constituent elements which will be or have been described in the claims or the specification is possible. For example, the second filter 43 may be omitted when the circulating water W1 sprayed in the cleaning portion 40 is flowed into the first chamber 52 by way of the cooling portion 30 or when the amount of solid constituents contained in the exhaust gases is small. In addition, at least part of the various configurations designed to enhance the heat exchanging efficiency can be omitted depending upon a heat exchanging efficiency required on the heat exchanger 82. Further, when the circulating water storage portion 50 does not include the dam 51, the whole of the circulating water storage portion 50 may be divided vertically.

What is claimed is:

1. An exhaust gas abatement system, comprising:
   an exhaust gas abatement section configured to abate exhaust gases by utilizing thermal energy and to cool the abated gases by using a liquid;
   a circulating section configured to circulate the liquid within a circulation path as a circulating liquid;
   a heat exchange tube configured to cool the circulating liquid and to execute a heat exchange between a cooling liquid which flows in an interior of the heat exchange tube and the circulating liquid which flows outside the heat exchange tube; and a circulating liquid storage portion configured to store the circulating liquid, wherein the heat exchange tube is disposed in a heat exchange tube installation space which is in at least part of an interior of the circulating liquid storage portion, the circulating liquid storage portion is divided into a first chamber and a second chamber by a dam, a first filter is provided adjacent to and facing the dam in the first chamber, and a gap is defined between an inner wall surface of the first chamber and an upper edge of the first filter, the heat exchange tube installation space is provided in the second chamber, the liquid used in the exhaust gas abatement section flows into the first chamber, and the liquid that flows into the first chamber permeates through the first filter and thereafter overflows from the first chamber by passing over the dam to flow into the second chamber.

2. The exhaust gas abatement system according to claim 1, wherein the heat exchange tube is configured so that the cooling liquid and the circulating liquid flow in opposite directions.

3. The exhaust gas abatement system according to claim 1, wherein the heat exchange tube executes a heat exchange between the cooling liquid which flows in an interior of the heat exchange tube and the circulating liquid which flows in the circulating water storage portion.

4. The exhaust gas abatement system according to claim 3, wherein the heat exchange tube installation space is formed as a serpentine channel in which the circulating liquid flows in a serpentine fashion, and wherein the heat exchange tube is disposed along the serpentine channel.

5. The exhaust gas abatement system according to claim 1, comprising further:

a circulating liquid tube configured to house the heat exchange tube in an interior thereof and to flow the circulating liquid between the heat exchange tube and the circulating liquid tube, wherein the heat exchange tube executes a heat exchange between the cooling liquid which flows in the interior of the heat exchange tube and the circulating liquid which flows from the circulating liquid storage portion into the circulating liquid tube, and the circulating liquid tube is formed into a serpentine channel in which the circulating liquid flows in a serpentine fashion.

6. The exhaust gas abatement system according to claim 1, wherein the heat exchange tube has a plurality of tube groups in each of which a plurality of tubes are arranged in a plate-like fashion, wherein the plurality of tube groups are disposed so as to be spaced apart from each other in the heat exchange tube installation space, and the heat exchange tube installation space is partitioned by the plurality of tube groups to thereby be formed into a serpentine channel in which the circulating liquid flows in a serpentine fashion.

7. The exhaust gas abatement system according to claim 1, wherein at least part of the circulating liquid storage portion has two or more chambers which are divided vertically by a partition wall and adjacent chambers of which communicate with each other, and the heat exchange tube installation space is in one of the two or more chambers.

8. The exhaust gas abatement system according to claim 1, wherein the heat exchange tube contains a resin material.

9. The exhaust gas abatement system according to claim 1, wherein in the liquid used in the exhaust gas abatement section, the liquid used on an upstream side of a flow path of the exhaust gases flows into the first chamber, while the liquid used on a downstream side of the flow path of the exhaust gases flows into the second chamber, a second filter is provided above the second chamber, and the liquid used on the downstream side of the flow path of the exhaust gases permeates through the second filter and thereafter flows into the second chamber.

10. An exhaust gas abatement system, comprising:

an exhaust gas abatement section configured to abate exhaust gases by utilizing thermal energy and to cool the abated gases by using a liquid;

a circulating section configured to circulate the liquid within a circulation path as a circulating liquid;

a heat exchange tube configured to cool the circulating liquid and to execute a heat exchange between a cooling liquid which flows in an interior of the heat exchange tube and the circulating liquid which flows outside the heat exchange tube; and a circulating liquid storage portion configured to store the circulating liquid, wherein the heat exchange tube is disposed in a heat exchange tube installation space which is in at least part of an interior of the circulating liquid storage portion, at least part of the circulating liquid storage portion has a first chamber, a second chamber and a third chamber, the first chamber being partitioned from the second and third chambers by a dam, the second and third chambers being divided vertically by a partition wall so that the third chamber is arranged below the second chamber and the second chamber and third chamber communicating with each other, and the heat exchange tube installation space is in the third chamber, wherein the liquid that flows into the first chamber overflows from the first chamber by passing over the dam to flow into the second chamber, and thereafter flows from the second chamber into the third chamber.

* * * * *